(12) United States Patent
Nagasoe et al.

(10) Patent No.: US 6,954,825 B2
(45) Date of Patent: Oct. 11, 2005

(54) DISK SUBSYSTEM

(75) Inventors: Yasuyuki Nagasoe, Odawara (JP); Mikio Fukuoka, Matsuda (JP); Takao Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 284 days.

(21) Appl. No.: 10/197,849

(22) Filed: Jul. 19, 2002

(65) Prior Publication Data

US 2003/0188102 A1 Oct. 2, 2003

(30) Foreign Application Priority Data

Mar. 27, 2002 (JP) ........................................ 2002-087382

(51) Int. Cl.[7] ............................................. G06F 12/00
(52) U.S. Cl. ....................................................... 711/114
(58) Field of Search ........................ 711/114; 707/204; 710/74

(56) References Cited

U.S. PATENT DOCUMENTS 6,038,570 A * 3/2000 Hitz et al. .................. 707/204
6,397,292 B1 * 5/2002 Venkatesh et al. ........... 711/114
6,567,890 B1 * 5/2003 Mulvey et al. .............. 711/114
6,654,831 B1 * 11/2003 Otterness et al. ............. 710/74

* cited by examiner

Primary Examiner—Kevin Verbrugge
(74) Attorney, Agent, or Firm—Mattingly, Stanger, Malur & Brundidge, P.C.

(57) ABSTRACT

The present invention creates real data and parity data using plural hard disk control units without changing the number of disk adapters per hard disk control unit and distributes and stores data in a hard disk.

While it is being requested that a disk utilization rate is increased maintaining the failure resistance of the hard disk, and, at the same time, to support the combination of the real data+parity data as before, it is desirable that the number of adapters that comprise the hard disk control unit should not be changed. According to the present invention, the number of hard disks that comprise RAID can be changed without changing the number of disk adapters per hard disk control unit.

17 Claims, 5 Drawing Sheets

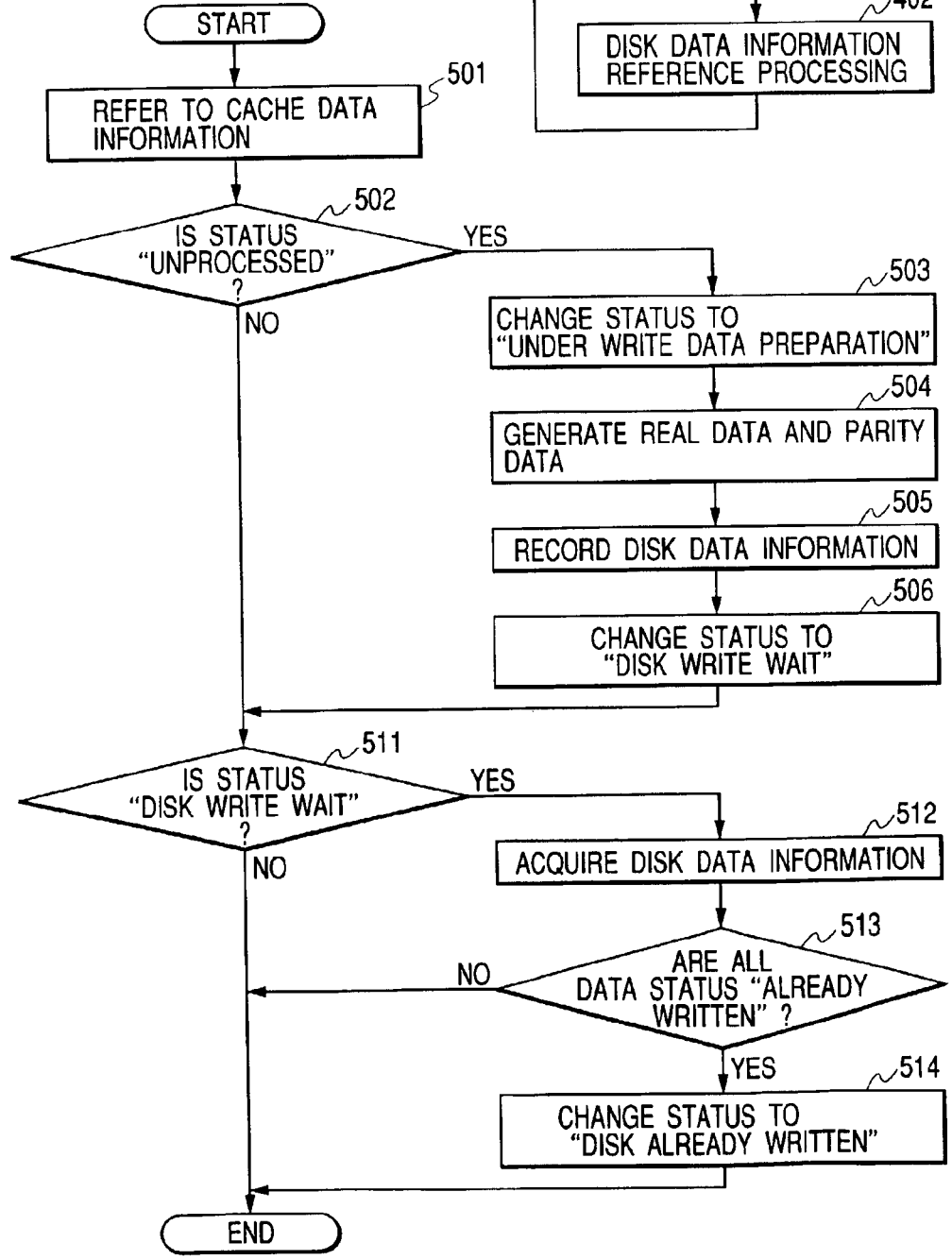

DISK SUBSYSTEM

FIELD OF THE INVENTION

The present invention relates to, in a disk subsystem that has one or more hard disks and a disk controller that controls the hard disk and transfers data between the disk controller and a host computer, a technique that distributes and stores data that is input and output from the host computer to the disk controller using the RAID architecture.

BACKGROUND OF THE INVENTION

In the disk subsystem that has one or more hard disks and a disk controller that controls the hard disk and transfers data between the disk controller and a host computer, when the data that is input and output from the host computer to the disk controller is distributed and stored using the RAID architecture, particularly the RAID5 architecture, the number of real data items (D) per parity data (P), that is, the number of drives in a magnetic-file stripe can be determined optionally.

If two hard disks that belong to the same stripe are provided in a fiber loop, however, the two hard disks will not be able to be used at the same time when a fiber loop fault occurred, thereby disabling the recovery of fault data using parity data. Accordingly, to ensure the redundancy of the hard disk when the fiber loop fault occurred, the number of hard disks per fiber loop must be set to 1. Thus, data will be distributed and stored as (n−1) real data items and 1 (one) parity data item for the number of fiber loops (n). A hard disk control unit is formed by collecting m disk adapters that control the fiber loop.

A disk controller realizes scalability by enabling increased and decreased installation in a unit of this hard disk control unit. When there has 1 hard disk control unit in the disk controller, the number of fiber loops is m, thereby establishing n=m. For example, when the number of disk adapters (m) in the hard disk control unit is 4, the number of fiber loops used is set to 4 and the magnetic-file stripe has the format of 3D+1P. Further, when the number of hard disk control units in the disk controller is also 2 or more, the hard disk control unit is operated for n=m by using the same logic as a single hard disk control unit. By distributing and storing data in the hard disk control unit in this manner, the operation of each hard disk control unit is let to have independence and the increased and decreased installation of the hard disk control unit was enabled without affecting the hard disk control unit in course of system operation.

SUMMARY OF THE INVENTION

Conventionally, since the distribution and storage of data was executed according to the RAID5 architecture using a hard disk control unit, the number of real data items (D) per parity data (P) is determined depending on the number of disk adapters (m) that comprise the hard disk control unit. Accordingly, it was general that a magnetic-file stripe has the format of (m−1)D+1P.

In recent years, it is requested that while the failure resistance of data is being maintained at the occurrence of a fiber loop fault, the rate of real data in the data stored in the hard disk, that is, a disk utilization rate be increased. In other words, it is requested that k of kD+1P is set to a higher number than (m−1). However, to ensure the failure resistance of data when the fiber loop fault occurred, two or more hard disks cannot be assigned to a fiber loop. Further, if the value of m is increased, the unit price of a hard disk control unit increases. At the same time, to support the format of (m−1)D+1P in the same manner as before, the conventional logic needs to be changed greatly. Accordingly, to suppress the unit price of the hard disk control unit and support a magnetic-file stripe of a conventional format, it is desirable that the number of adapters that comprise the hard disk control unit should be kept set to m.

Accordingly, a disk subsystem that sets k of kD+1P to a higher number than (m−1) had to be realized using the hard disk control unit of which the number of adapters used as before is m.

To set k of kD+1P to a higher number than (m−1) with the number of disk adapters per hard disk control unit kept in m without changing it, a parity data item and (jm−1) real data items are created using j hard disk control units and data is distributed and stored in jm hard disks. That is, by using the format of (jm−1)D+1P, a utilization rate of a hard disk is increased maintaining the failure resistance of the hard disk and the conventional format of (m−1)D+1P is also supported. For example, if the number (m) of disk adapters in the hard disk control unit is 4 and the number of hard disk control units (j) used is 2, the data distribution and storage format is set to 7D+1P. In this case, because the number of disk adapters in the hard disk control unit is the same as before, the format of 3D+1P in which data is distributed and stored in a hard disk unit can also be used as before.

BRIEF DESCRIPTION OF THE DRAWINGS

FIG. 4 is a flowchart showing processing of a processor when the write data is written from the cache memory to the hard disk according to the present invention;

FIG. 5 is another flowchart showing the processing of the processor when the write data is written from the cache memory to the hard disk according to the present invention.

DESCRIPTION OF THE PREFERRED EMBODIMENTS

The embodiments of the present invention are described below in detail with reference to the drawings.

Figure 1:
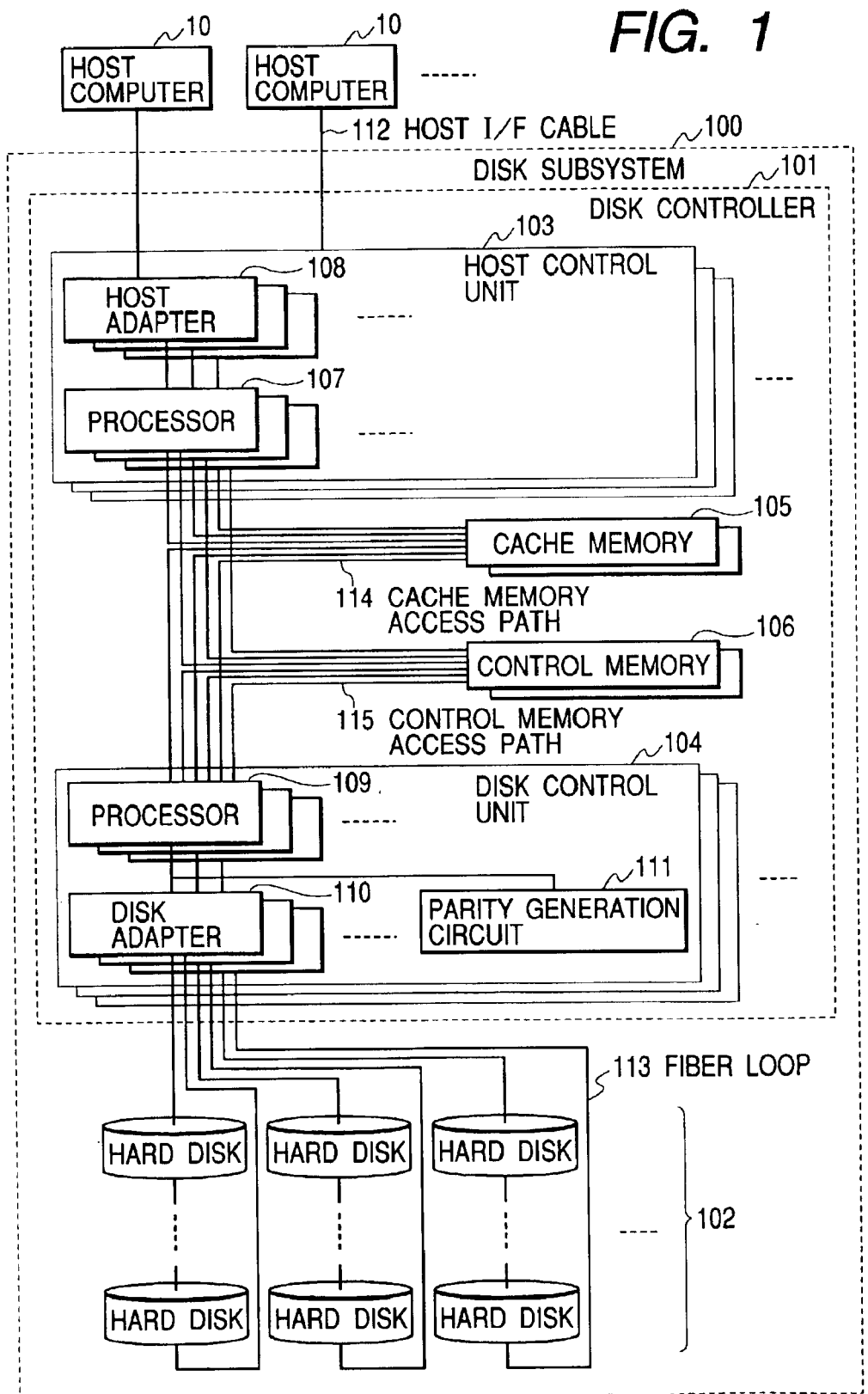
FIG. 1 is a block diagram showing the configuration of a disk subsystem to which the present invention applies.

FIG. 1 is an overview of the configuration of a disk subsystem to which the present invention applies. In this embodiment, a disk subsystem 100 has a disk controller 101 and plural hard disks 102, and the disk controller 101 is connected to plural host computers 10. The disk controller 101 has one or more host control unit 103, one or more disk control unit 104, a cache memory 105, and a control memory 106. The host control unit 103 includes one or more processor 107 and one or more host adapter 108, and the disk control unit 104 includes one or more processor 109, one or more disk adapters 110, and a parity generation circuit 111. A host I/F cable 112 connects the host computer 10 with the host adapter 108, and a fiber loop 113 connects the hard disk 102 with a disk adapter 110. A cache access path 114 connects the processors 107, 109 with the cache memory 105, and a control memory access path 115 connects the processors 107, 109 with the control memory 106.

If a write request is issued from the host computer 10 to the hard disk 102, write data is first transferred to the host control unit 103 via the host adapter 108. The processor 107 writes the write data to the cache memory 105 and writes to the control memory 106 that the write data was written to the cache memory 105. The processor 109 of the disk control unit 104 recognizes that the write data was written to the cache memory 105 by referring to the control memory 106 and the write data is distributed into a plurality of real data. The parity generation circuit 111 generates parity data and writes the plural real data and the parity data to the hard disk 102.

Figure 2:
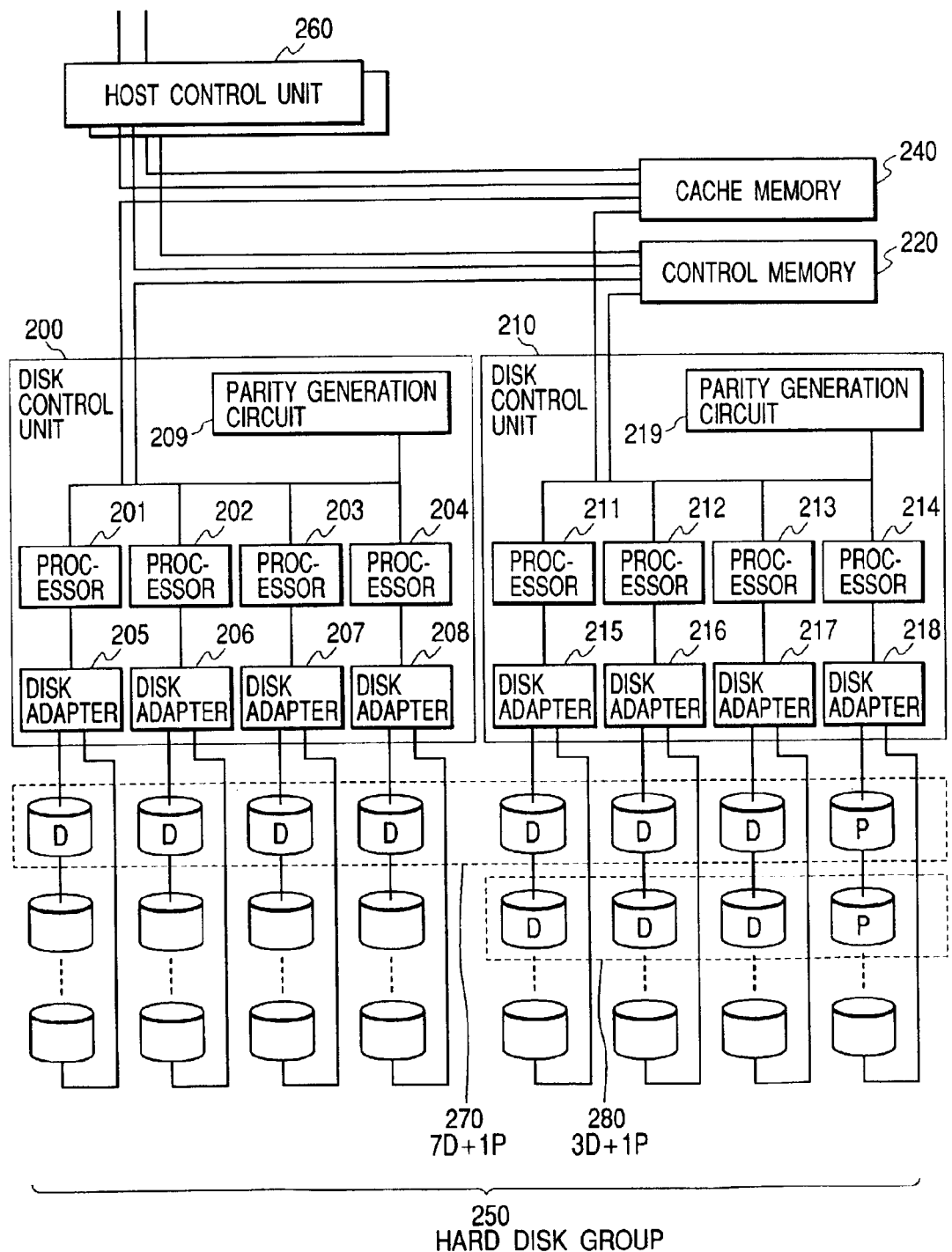
FIG. 2 is a block diagram showing the distribution and storage of data according to the present invention.

FIG. 2 is a diagram showing the distribution and storage of data according to the present invention. Two disk control units 200, 210 have 4 processors 201 to 204, 211 to 214, 4 disk adapters 205 to 208, 215 to 218 respectively, and parity generation circuits 209, 219. In the embodiment of the present invention, data is distributed and stored into each of a plurality of hard disks connected to plural disk control units. In this embodiment, a hard disk control unit has 4 disk adapters, and data is distributed and stored using two hard disk control units. Accordingly, the format of a magnetic-file stripe in which data is distributed and stored in a hard disk group 250 is set to 7D+1P (270). Further, as same as the conventional art, the data can be distributed and stored by a hard disk connected to a hard disk control unit according to the magnetic-file stripe having the format of 3D+1P (280). FIG. 2 shows an example of the magnetic-file stripe in which the data is distributed and stored in the format of 7D+1P and the format of 3D+1P. In this example, although parity data is stored in a hard disk connected to the disk adapter 218, for the RAID5 architecture, the parity data is stored in any of the hard disks of the magnetic-file stripe by a predetermined unit.

Figure 3:
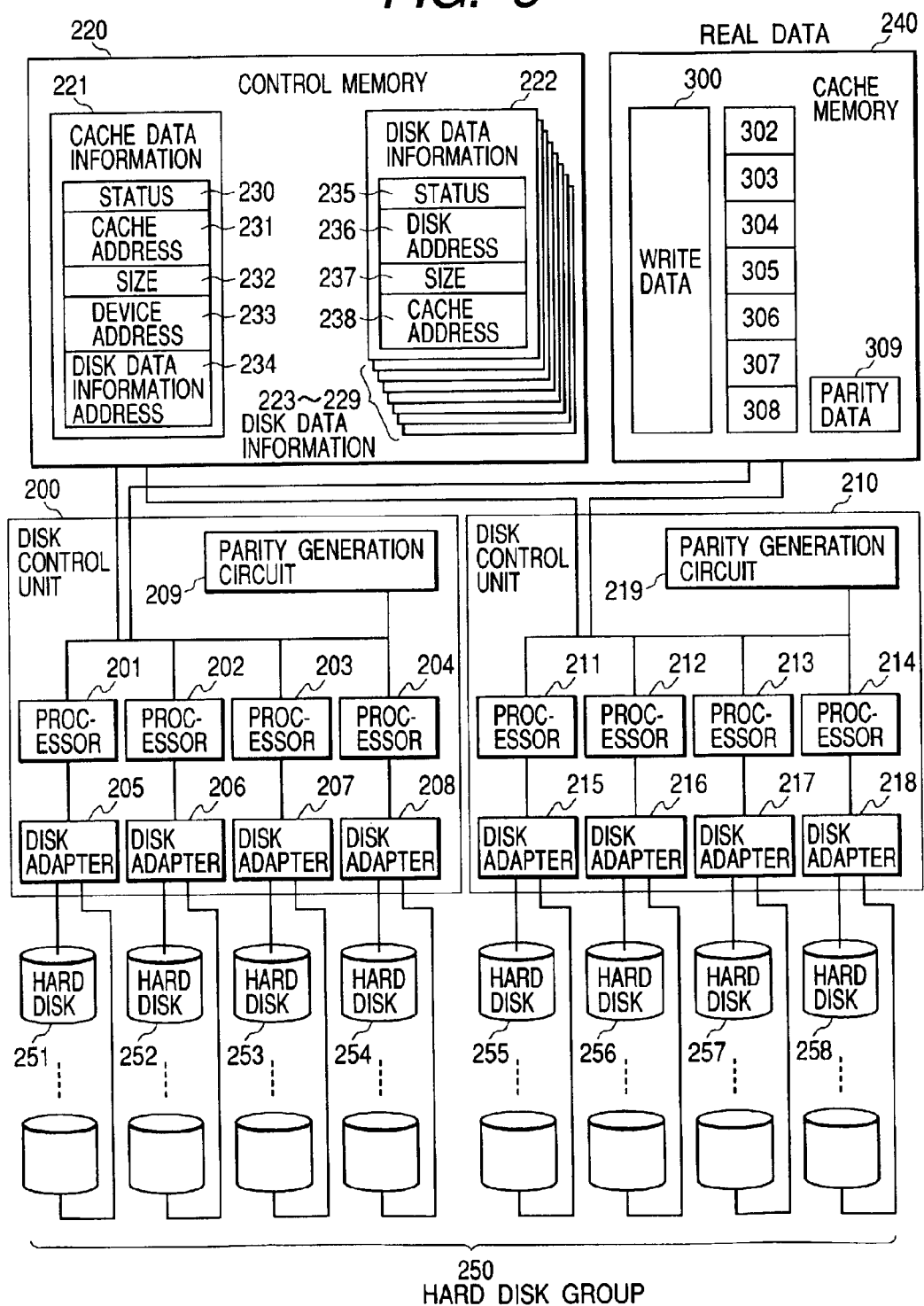
FIG. 3 is a block diagram showing detailed data when write data is written from a cache memory to a hard disk according to the present invention.
Figure 6:
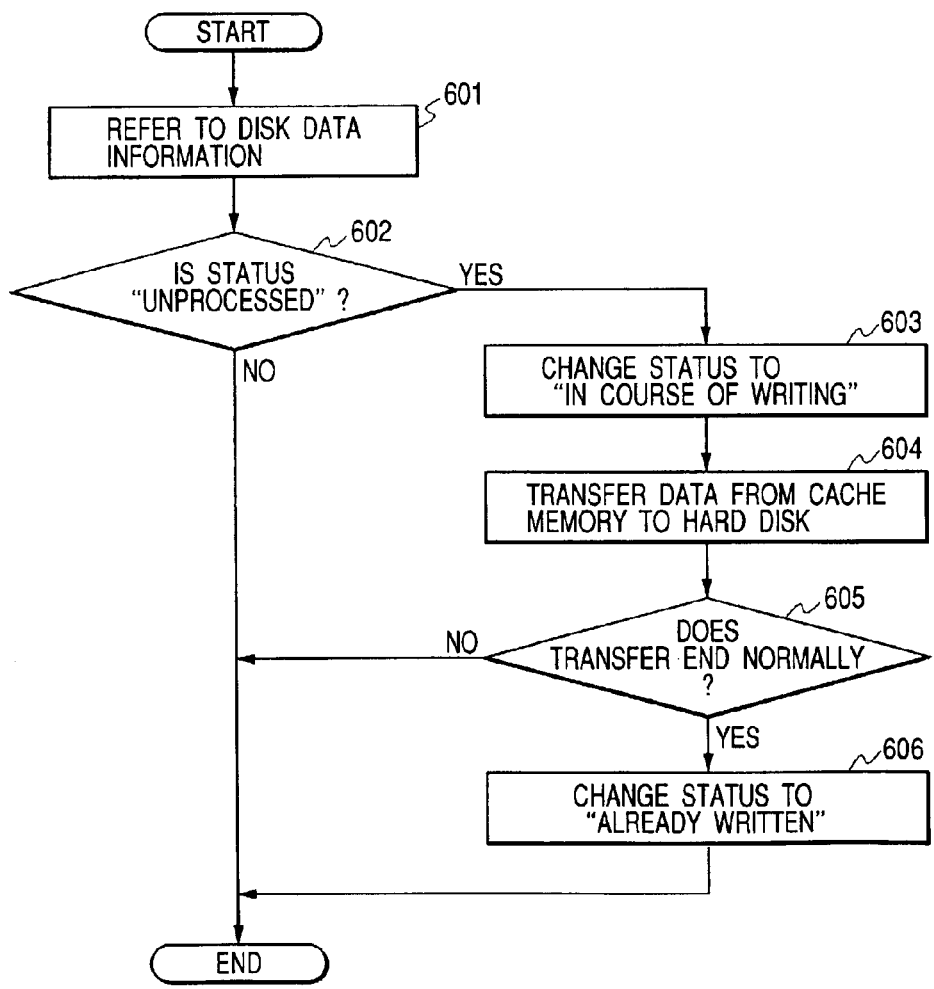
FIG. 6 is a further flowchart showing the processing of the processor when the write data is written from the cache memory to the hard disk according to the present invention.

FIG. 3 is a block diagram showing detailed data until a processor of the disk control unit writes write data from a cache memory to a hard disk. FIGS. 4 to 6 are flowcharts showing the processing of each processor of the disk control unit that realizes writing of the write data from the cache memory to the hard disk.

As shown in FIG. 4, the respective processors 201 to 204, 211 to 214 repetitively execute cache data reference processing (401) and disk data reference processing (402).

FIG. 5 is a flowchart of cache data reference processing. The respective processors 201 to 204, 211 to 214 refer to cache data information 221 on a control memory 220 (501) and monitor whether status 230 is "Unprocessed" or not. When the processor 201 detects the cache data information 221 about which the status 230 is "Unprocessed" (502), the processor 201 changes the status 230 to "Under write data preparation" (503). The processor 201 acquires write data 300 on a cache memory 240 by referring to a cache address 231 and a size 232, distributes the write data 300 into real data 302 to 308, generates parity data 309 using the parity generation circuit 209, and stores the real data 302 to 308 and the parity data 309 in the cache memory 240 (504). Subsequently, the processor 201 calculates a disk address and a size of data storage locations of the respective hard disks 251 to 258 by referring to a device address 233 and the size 232, records eight disk data information 222 to 229 for each hard disks on the control memory 220, and stores the storage addresses of the disk data information 222 to 229 in a disk data information address 234 (505). "Unprocessed" is all recorded in status 235 of the disk data information 222 to 229 to be recorded. The data storage locations of the respective hard disks 251 to 258 are recorded in a disk address 236 and a size 237 and the storage locations of the real data 302 to 308 respectively or the storage location of the parity data 309 are recorded in a cache address. Finally, the processor 201 specifies the status 230 for a "Disk write wait" (506).

Further, the processors 201 to 204, 211 to 214 monitor whether the status 230 is specified for the "Disk write wait" or not by referring to the cache data information 221 on the control memory 220. In this case, because the status 230 is specified for the "Disk write wait" in the step (506), disk data information is acquired. Because "Unprocessed" is all recorded in the status 235 in the step (505), the cache data reference processing is terminated.

FIG. 6 is a flowchart of disk data reference processing. The respective processors 201 to 204, 211 to 214 monitor whether the status 235 is "Unprocessed" or not by referring to the disk data information 222 to 229 for the hard disk under control of a self processor on the control memory 220 (601). The processor 202 detects the disk data information 223 for the hard disk 252 in which the status 235 is "Unprocessed" (602) and changes the status 235 to "In course of writing" (603). The processor 202 acquires the real data 303 on a cache by referring to the cache address 238 and the size 237 and transfers real data 303 to the disk address 236 via the disk adapter 206 (604). If transfer is ended normally (605), the status 235 is set to "Already written" (606). The processors 201, 203, 204, 211 to 214 monitor another disk data information 222, 224 to 229 respectively. If the transfer to the hard disks 251, 253 to 258 is ended normally via the disk adapters 205, 207, 208, 215 to 218, the status 235 of the disk data information 222, 224 to 229 is set to "Already written".

The respective processors 201 to 204, 211 to 214 re-execute the cache data reference processing. If the status 230 is "Unprocessed" by referring to the cache data information 221 on the control memory 220 (501), the processing 503 to 506 are executed. Subsequently, the respective processors 201 to 204, 211 to 214 monitor whether the status 230 is set to a "Disk write wait" or not. When the processor 203 detects the cache data information 221 about which the status 230 is set to the "Disk write wait" (511), the processor 203 acquires the disk data information 222 to 229 by referring to the disk data information address 234 (512). The status 235 of the data in which the data transfer to a hard disk is ended normally by the disk data reference processing is set to "Already written". If all of the status 235 are set to "Already written" (513), the status 230 is changed to "Disk already written" (514).

In the disk subsystem that stores data using the RAID5 architecture, a disk utilization rate can be increased without changing redundancy by enabling an increase in the number of real data items per one parity data while maintaining the compatibility with the conventional method. Further, sequential performance can be improved by increasing the number of hard disks processed concurrently.

What is claimed is:

1. A disk subsystem for distributing and storing a plurality of data items and a parity data item generated from said plurality of data items into any of a plurality of hard disks, having:

a plurality of disk adapters, each said disk adapter having a plurality of said hard disks connected thereto;

a plurality of disk control units, each disk control unit having a plurality of disk adapters; and a disk controller having a plurality of disk control units,
wherein said plurality of data items and said parity data item are distributed and stored in each of said plurality of hard disks connected to each of said plurality of disk adapters respectively, included in each of said plurality of disk control units.

2. The disk subsystem according to claim 1, wherein there are provided a plurality of fiber loops and said plurality of hard disks and one of said plurality of disk adapters are connected using one of said plurality of fiber loops.

3. The disk subsystem according to claim 2, wherein one hard disk into which said plurality of data items and said parity data items are distributed and stored is set from said one of said plurality of fiber loops.

4. The disk subsystem according to claim 1, wherein there are provided a plurality of fiber loops and one of said plurality of fiber loops is connected to one of said plurality of disk adapters.

5. A disk subsystem for distributing and storing a plurality of data items and parity data items generated from said plurality of data items into any of a plurality of hard disks, having:
   a plurality of disk adapters, each said disk adapter having a plurality of said hard disks connected thereto;
   a disk control unit having n said disk adapters; and
   a disk controller having a plurality of said disk control units,
wherein said plurality of data items and said parity data items are distributed and stored in each of said plurality of hard disks connected to each of mn disk adapters respectively, included in m disk control units of said plurality of disk control units as (mn−1) data items and a parity data item.

6. The disk subsystem according to claim 5, wherein n=4 and m=2 are provided.

7. The disk subsystem according to claim 5, wherein there are provided a plurality of fiber loops and said plurality of hard disks and one of said plurality of disk adapters are connected using one of said plurality of fiber loops.

8. The disk subsystem according to claim 7, wherein one hard disk into which said plurality of data items and said parity data items are distributed and stored is set from said one of said plurality of fiber loops.

9. The disk subsystem according to claim 5, wherein there are provided a plurality of fiber loops and one of said plurality of fiber loops is connected to one of said plurality of disk adapters.

10. A disk subsystem for distributing and storing a plurality of data items and a parity data item generated from said plurality of data items into a plurality of hard disks, having:
    a plurality of disk adapters, each said disk adapter having a plurality of said hard disks connected thereto;
    a plurality of disk control units having a plurality of said disk adapters; and
    a disk controller having said plurality of disk control units,
wherein there are provided, said plurality of data items and said parity data item that are distributed and stored in each of said plurality of hard disks connected to each of said plurality of disk adapters included in each of said plurality of disk control units, and
further wherein there are provided another plurality of data items and another parity data item that are distributed and stored in each of said plurality of hard disks connected to each of said plurality of disk adapters included in a single disk control unit.

11. The disk subsystem according to claim 10, wherein there are provided a plurality of fiber loops and said plurality of hard disks and one of said plurality of disk adapters are connected using one of said plurality of fiber loops.

12. The disk subsystem according to claim 11, wherein one hard disk into which said plurality of data items and said parity data item are distributed and stored is set from said one of said plurality of fiber loops.

13. The disk subsystem according to claim 10, wherein there are provided a plurality of fiber loops and one of said plurality of fiber loops is connected to one of said plurality of disk adapters.

14. A disk subsystem for enabling a plurality of data items and parity data items in a parity group to be stored over a plurality of disk adapters arranged in a plurality of disk control units, said disk subsystem comprising:
    a plurality of disk control units, each said disk control unit including at least one disk adapter such that a plurality of disk adapters are arranged and dispersed among said plurality of disk control units;
    each said disk adapter controlling at least one hard disk in communication therewith, such that one or more of said hard disks are arranged with one of said plurality of disk adapters while others of said hard disks are arranged with others of said disk adapters, wherein
    each of a plurality of data items, and parity data items generated from the plurality of data items, is stored in said plurality of disk control units in hard disks under control of said plurality of disk adapters which are different from one another.

15. The disk subsystem according to claim 14, wherein there are provided a plurality of fiber loops and said plurality of hard disks and one of said plurality of disk adapters are connected using one of said plurality of fiber loops.

16. The disk subsystem according to claim 15, wherein one hard disk into which said plurality of data items and said parity data items are distributed and stored is set from said one of said plurality of fiber loops.

17. The disk subsystem according to claim 14, wherein there are provided a plurality of fiber loops and one of said plurality of fiber loops is connected to one of said plurality of disk adapters.

* * * * *